United States Patent
Homma

(10) Patent No.: US 12,215,248 B2
(45) Date of Patent: Feb. 4, 2025

(54) RESIN COMPOSITION, OPTICAL FIBER, AND METHOD FOR PRODUCING OPTICAL FIBER USING POLYOL BETWEEN 8000 AND 20000 AVERAGE MOLECULAR WEIGHT

(71) Applicant: SUMITOMO ELECTRIC INDUSTRIES, LTD., Osaka (JP)

(72) Inventor: Yuya Homma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 166 days.

(21) Appl. No.: 18/010,042

(22) PCT Filed: May 6, 2021

(86) PCT No.: PCT/JP2021/017380
§ 371 (c)(1),
(2) Date: Dec. 13, 2022

(87) PCT Pub. No.: WO2021/261088
PCT Pub. Date: Dec. 30, 2021

(65) Prior Publication Data
US 2023/0193073 A1    Jun. 22, 2023

(30) Foreign Application Priority Data
Jun. 24, 2020 (JP) ................. 2020-108664

(51) Int. Cl.
*C09D 175/08*    (2006.01)
*C03C 25/1065*    (2018.01)
(Continued)

(52) U.S. Cl.
CPC ........ *C09D 175/08* (2013.01); *C03C 25/1065* (2013.01); *C03C 25/285* (2013.01);
(Continued)

(58) Field of Classification Search
None
See application file for complete search history.

(56) References Cited

U.S. PATENT DOCUMENTS

| | | |
|---|---|---|
| 5,093,386 A | 3/1992 | Bishop et al. |
| 5,373,578 A | 12/1994 | Parker et al. |

(Continued)

FOREIGN PATENT DOCUMENTS

| | | |
|---|---|---|
| EP | 1 347 003 A1 | 9/2003 |
| JP | S63-085030 A | 4/1988 |

(Continued)

OTHER PUBLICATIONS

U.S. Notice of Allowance issued Jul. 11, 2024 in U.S. Appl. No. 17/790,166.
(Continued)

*Primary Examiner* — Andrew Jordan
(74) *Attorney, Agent, or Firm* — Faegre Drinker Biddle & Reath LLP

(57) ABSTRACT

A resin composition for the secondary coating of an optical fiber is a resin composition containing a non-reactive urethane compound having a number average molecular weight of 10000 or more and 50000 or less, a photopolymerizable compound, and a photopolymerization initiator, the content of the non-reactive urethane compound is 0.05 parts by mass or more and 5 parts by mass or less based on the total amount of the resin composition, and the non-reactive urethane compound is a reaction product of a polyol having a number average molecular weight of 8000 or more and 20000 or less, a diisocyanate, and a compound having active hydrogen.

7 Claims, 1 Drawing Sheet

(51) Int. Cl.
  *C03C 25/285* (2018.01)
  *C03C 25/326* (2018.01)
  *C03C 25/6226* (2018.01)
  *C08F 283/00* (2006.01)
  *G02B 6/02* (2006.01)
(52) U.S. Cl.
  CPC ........ *C03C 25/326* (2013.01); *C03C 25/6226* (2013.01); *C08F 283/008* (2013.01); *G02B 6/02395* (2013.01)

(56) References Cited

U.S. PATENT DOCUMENTS

| | | | | |
|---|---|---|---|---|
| 5,475,074 A * | 12/1995 | Matsuoka | G02B 1/04 | 526/332 |
| 5,767,935 A * | 6/1998 | Ueda | G02F 1/133504 | 430/290 |
| 5,932,393 A * | 8/1999 | Cunningham | C07F 5/027 | 430/920 |
| 6,045,974 A * | 4/2000 | Cunningham | G03F 7/029 | 522/182 |
| 6,395,124 B1 * | 5/2002 | Oxman | C09J 4/00 | 156/275.7 |
| 6,486,225 B1 * | 11/2002 | Kamata | C09D 175/16 | 524/718 |
| 6,692,611 B2 * | 2/2004 | Oxman | C09J 4/06 | 156/275.7 |
| 6,853,788 B2 | 2/2005 | Oshio et al. | | |
| 7,081,486 B2 * | 7/2006 | Imai | C08F 2/46 | 522/167 |
| 7,120,342 B2 * | 10/2006 | Chang | C08L 33/14 | 385/115 |
| 7,354,958 B2 * | 4/2008 | Ohkoshi | C08K 3/22 | 522/74 |
| 7,551,811 B2 * | 6/2009 | Aoki | G02B 6/1221 | 385/14 |
| 7,649,027 B2 * | 1/2010 | Imai | C08F 2/48 | 522/134 |
| 7,906,566 B2 | 3/2011 | Sugimoto et al. | | |
| 8,620,127 B2 * | 12/2013 | Yamaguchi | G02B 6/1221 | 385/129 |
| 9,057,856 B2 * | 6/2015 | Sakabe | G02B 6/4403 | |
| 9,229,159 B2 * | 1/2016 | Sohma | G02B 1/048 | |
| 9,256,041 B2 * | 2/2016 | Homma | G02B 6/4432 | |
| 9,285,536 B2 * | 3/2016 | Homma | G02B 6/02395 | |
| 9,766,397 B2 * | 9/2017 | Homma | G02B 6/02395 | |
| 9,829,625 B2 * | 11/2017 | Homma | G02B 1/14 | |
| 9,914,687 B2 * | 3/2018 | Shiota | C07C 309/66 | |
| 10,048,436 B2 * | 8/2018 | Homma | C08G 18/755 | |
| 10,162,108 B2 * | 12/2018 | Homma | G02B 6/02395 | |
| 10,234,761 B2 * | 3/2019 | Tanaka | C07D 409/14 | |
| 10,315,394 B2 * | 6/2019 | Fuse | B32B 27/06 | |
| 10,358,577 B2 * | 7/2019 | Homma | C03C 25/1065 | |
| 10,471,758 B2 * | 11/2019 | Harada | G02B 5/203 | |
| 10,509,161 B2 * | 12/2019 | Shimada | C03C 25/1065 | |
| 11,079,675 B2 * | 8/2021 | Miyamoto | C07D 295/192 | |
| 11,413,682 B2 * | 8/2022 | Matsumoto | C03C 17/28 | |
| 11,828,996 B2 * | 11/2023 | Iwaguchi | G02B 6/4403 | |
| 11,914,186 B2 * | 2/2024 | Hamakubo | C09D 151/08 | |
| 11,919,804 B2 * | 3/2024 | Hamakubo | C03C 25/1065 | |
| 11,953,744 B2 * | 4/2024 | Iwaguchi | C08F 290/067 | |
| 12,025,829 B2 * | 7/2024 | Tokuda | C03C 25/285 | |
| 12,054,632 B2 * | 8/2024 | Homma | C08F 290/067 | |
| 2002/0062919 A1 * | 5/2002 | Oxman | C09D 4/00 | 156/182 |
| 2002/0066528 A1 * | 6/2002 | Oxman | C08F 290/067 | 156/309.3 |
| 2004/0134604 A1 * | 7/2004 | Oxman | C09J 4/06 | 156/275.5 |
| 2005/0143481 A1 * | 6/2005 | Imai | C08F 2/46 | 522/1 |
| 2005/0213910 A1 * | 9/2005 | Chang | C08F 2/48 | 385/128 |
| 2005/0272829 A1 * | 12/2005 | Sugimoto | C08F 283/06 | 522/178 |
| 2006/0171627 A1 * | 8/2006 | Aoki | G02B 6/1221 | 385/14 |
| 2006/0217479 A1 * | 9/2006 | Ohkoshi | C08K 3/22 | 524/436 |
| 2007/0203258 A1 | 8/2007 | Sugimoto et al. | | |
| 2009/0023830 A1 * | 1/2009 | Imai | C08F 2/48 | 522/74 |
| 2011/0123929 A1 * | 5/2011 | Fujita | G03F 7/0007 | 522/63 |
| 2011/0188827 A1 * | 8/2011 | Yamaguchi | G02B 6/138 | 385/129 |
| 2012/0321270 A1 | 12/2012 | Imai et al. | | |
| 2014/0079362 A1 * | 3/2014 | Sohma | C03C 25/106 | 385/123 |
| 2014/0119698 A1 * | 5/2014 | Sakabe | G02B 6/4403 | 385/100 |
| 2015/0192734 A1 * | 7/2015 | Homma | G02B 6/4429 | 385/102 |
| 2015/0192749 A1 * | 7/2015 | Homma | G02B 6/4432 | 385/103 |
| 2015/0284556 A1 * | 10/2015 | Sugiyama | C08F 2/48 | 522/18 |
| 2016/0046552 A1 * | 2/2016 | Shiota | C08F 16/24 | 560/194 |
| 2016/0377802 A1 * | 12/2016 | Homma | G02B 6/0288 | 385/114 |
| 2016/0377977 A1 * | 12/2016 | Tanaka | G02B 5/201 | 359/891 |
| 2017/0003446 A1 * | 1/2017 | Homma | C03C 25/1065 | |
| 2017/0239923 A1 * | 8/2017 | Fuse | B32B 27/08 | |
| 2018/0001691 A1 * | 1/2018 | Harada | B42D 25/465 | |
| 2018/0095221 A1 * | 4/2018 | Homma | C03C 25/1065 | |
| 2018/0105462 A1 * | 4/2018 | Shimada | C03C 25/475 | |
| 2018/0128970 A1 * | 5/2018 | Homma | C08G 18/4825 | |
| 2018/0364437 A1 | 12/2018 | Tachibana et al. | | |
| 2018/0372971 A1 | 12/2018 | Terruzzi et al. | | |
| 2019/0064433 A1 | 2/2019 | Homma et al. | | |
| 2019/0064434 A1 * | 2/2019 | Shimada | C03C 25/1065 | |
| 2019/0127605 A1 * | 5/2019 | Homma | C08G 18/672 | |
| 2019/0137872 A1 * | 5/2019 | Miyamoto | C07D 295/192 | |
| 2020/0139433 A1 * | 5/2020 | Matsumoto | C09C 1/48 | |
| 2021/0026065 A1 * | 1/2021 | Hamakubo | C08F 290/067 | |
| 2021/0088719 A1 | 3/2021 | Tachibana et al. | | |
| 2021/0188705 A1 | 6/2021 | Hamakubo | | |
| 2021/0238316 A1 * | 8/2021 | Takigawa | C09J 175/16 | |
| 2021/0309566 A1 * | 10/2021 | Hamakubo | C03C 25/285 | |
| 2022/0017768 A1 * | 1/2022 | Tokuda | C08F 290/00 | |
| 2022/0283497 A1 * | 9/2022 | Shimizu | C07D 333/76 | |
| 2022/0363913 A1 * | 11/2022 | Homma | C09D 151/003 | |
| 2023/0042395 A1 * | 2/2023 | Nomura | G02B 6/02395 | |
| 2023/0046664 A1 | 2/2023 | Homma | | |
| 2023/0049256 A1 * | 2/2023 | Homma | C08G 18/672 | |
| 2023/0071877 A1 | 3/2023 | Homma | | |
| 2023/0112900 A1 * | 4/2023 | Iwaguchi | C03C 25/32 | 385/114 |
| 2023/0140824 A1 * | 5/2023 | Iwaguchi | G02B 6/4403 | 385/114 |
| 2023/0193073 A1 * | 6/2023 | Homma | C08G 18/4845 | 385/123 |
| 2023/0242690 A1 * | 8/2023 | Homma | G02B 6/02395 | 525/226 |
| 2023/0312778 A1 * | 10/2023 | Hamakubo | G02B 6/02395 | 526/301 |
| 2023/0357480 A1 * | 11/2023 | Homma | C03C 25/1065 | |
| 2023/0365735 A1 * | 11/2023 | Homma | C08F 2/50 | |
| 2023/0365736 A1 * | 11/2023 | Homma | C03C 25/1065 | |
| 2023/0416483 A1 * | 12/2023 | Hamakubo | C09D 151/08 | |
| 2024/0018137 A1 * | 1/2024 | Yamashita | C07D 417/14 | |
| 2024/0026116 A1 * | 1/2024 | Hamakubo | C08K 3/20 | |
| 2024/0052173 A1 * | 2/2024 | Hamakubo | G02B 6/02395 | |
| 2024/0101474 A1 * | 3/2024 | Homma | C08G 18/809 | |
| 2024/0116807 A1 * | 4/2024 | Homma | C08G 18/672 | |

(56) References Cited

U.S. PATENT DOCUMENTS

| | | | |
|---|---|---|---|
| 2024/0288629 A1* | 8/2024 | Iwaguchi | ............ G02B 6/02395 |
| 2024/0288630 A1* | 8/2024 | Iwaguchi | .............. C03C 25/109 |

FOREIGN PATENT DOCUMENTS

| | | | |
|---|---|---|---|
| JP | H07-215737 A | 8/1995 | |
| JP | H09-278850 A | 10/1997 | |
| JP | H09-328632 A | 12/1997 | |
| JP | 2005-089586 A | 4/2005 | |
| JP | 2006-036989 A | 2/2006 | |
| JP | 2008-247981 A | 10/2008 | |
| JP | 2009-514994 A | 4/2009 | |
| JP | 2009-227988 A | 10/2009 | |
| JP | 2010-510332 A | 4/2010 | |
| JP | 2010-235814 A | 10/2010 | |
| JP | 2016-194061 A | 11/2016 | |
| JP | 2019-007992 A | 1/2019 | |
| JP | 2019-040119 A | 3/2019 | |
| WO | WO-97/038035 A1 | 10/1997 | |
| WO | WO-2005/026228 A1 | 3/2005 | |
| WO | WO-2007/050308 A1 | 5/2007 | |
| WO | WO-2008/076285 A1 | 6/2008 | |
| WO | WO-2009/108056 A1 | 9/2009 | |
| WO | WO-2013/077260 A1 | 5/2013 | |
| WO | WO-2013/099766 A1 | 7/2013 | |
| WO | WO-2017/103655 A1 | 6/2017 | |
| WO | WO-2019/026356 A1 | 2/2019 | |
| WO | WO-2019/221126 A1 | 11/2019 | |
| WO | WO-2020/040223 A1 | 2/2020 | |

OTHER PUBLICATIONS

Notice of Allowance mailed Jun. 21, 2024 for U.S. Appl. No. 17/790,181.

First Chinese Office Action issued Jun. 21, 2023 in Application No. 202080089758.

U.S. Office Action issued Apr. 9, 2024 in U.S. Appl. No. 17/790,166.

U.S. Notice of Allowance issued Nov. 18, 2024 in U.S. Appl. No. 17/790,166.

U.S. Notice of Allowance issued Nov. 20, 2024 in U.S. Appl. No. 17/790,181.

\* cited by examiner

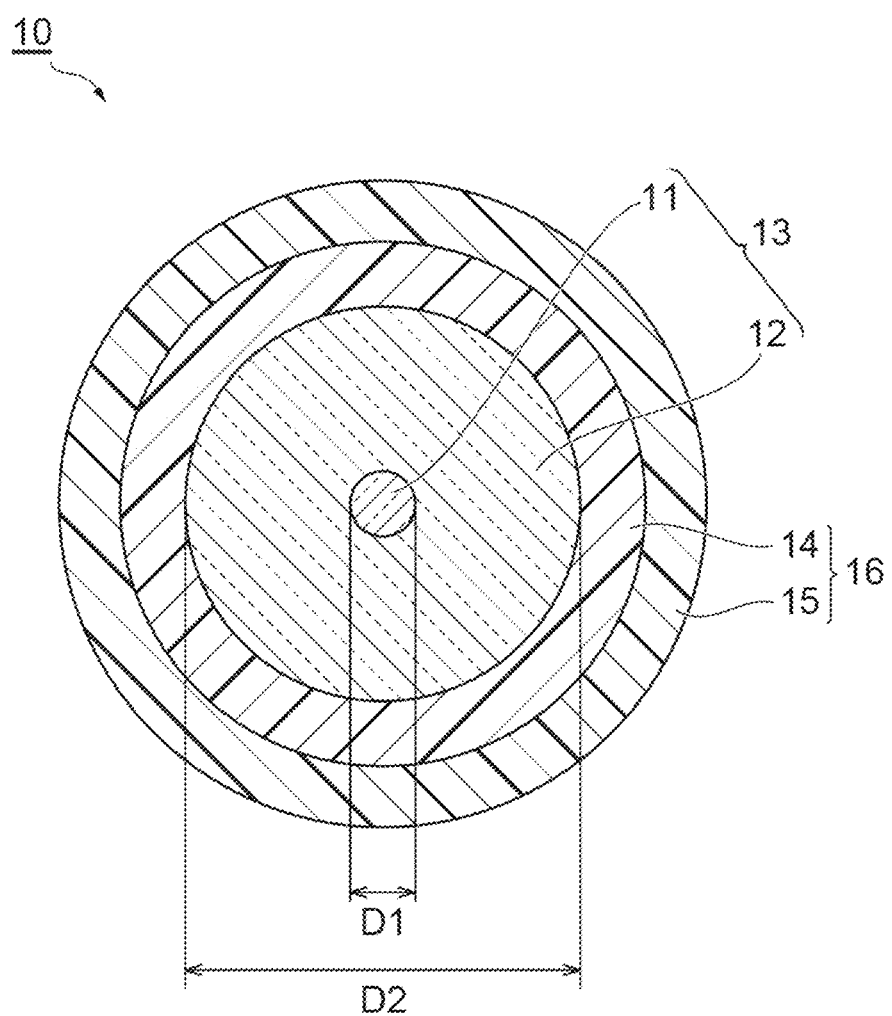

RESIN COMPOSITION, OPTICAL FIBER, AND METHOD FOR PRODUCING OPTICAL FIBER USING POLYOL BETWEEN 8000 AND 20000 AVERAGE MOLECULAR WEIGHT

TECHNICAL FIELD

The present disclosure relates to a resin composition for secondary coating of an optical fiber, an optical fiber, and a method for producing the optical fiber.

The present application claims the priority based on Japanese application No. 2020-108664, filed on Jun. 24, 2020, and the content described in the Japanese application is incorporated herein in its entirety.

BACKGROUND ART

An optical fiber commonly comprises a coating resin layer for protecting a glass fiber that is an optical transmission medium. For example, the coating resin layer comprises two layers that are a primary resin layer in contact with the glass fibers and a secondary resin layer formed on the outer layer of the primary resin layer. A secondary resin layer is required to have a high Young's modulus for enhancing microbending resistance and to have the surface slidability, the scratch resistance, and the tack preventing property for improving the handleability of an optical fiber.

For example, improvement in surface slidability by forming a resin layer using a resin composition containing a silicone compound is disclosed in Patent Literatures 1 and 2. Improvement in a tack preventing property by forming a resin layer using a resin composition containing a specific urethane (meth)acrylate is disclosed in Patent Literatures 3 and 4.

CITATION LIST

Patent Literature

Patent Literature 1: JP H9-278850 A
Patent Literature 2: JP H9-328632 A
Patent Literature 3: JP 2006-36989 A
Patent Literature 4: JP 2005-89586 A

SUMMARY OF INVENTION

A resin composition for secondary coating of an optical fiber according to one aspect of the present disclosure is a resin composition comprising: a non-reactive urethane compound having a number average molecular weight of 10000 or more and 50000 or less, a photopolymerizable compound, and a photopolymerization initiator, wherein the content of the non-reactive urethane compound is 0.05 parts by mass or more and 5 parts by mass or less based on the total amount of the resin composition, and the non-reactive urethane compound is a reaction product of a polyol having a number average molecular weight of 8000 or more and 20000 or less, a diisocyanate, and a compound having active hydrogen.

BRIEF DESCRIPTION OF DRAWINGS

FIG. 1 is a schematic sectional view showing one example of an optical fiber according to the present embodiment.

DESCRIPTION OF EMBODIMENTS

Problem to be Solved by the Present Disclosure

In production lines of optical fibers, the surface slidability of coating resin layers may deteriorate gradually, and optical fibers may meander when the optical fibers are wound on bobbins, and the productivity of the optical fibers may deteriorate by external forces such as contact with guide rollers and screening tests (tests in which a tensile load of several kilograms is applied to optical fibers, and parts having low strength are removed beforehand). To improve the productivity of optical fibers, a secondary resin layer is required to be excellent in surface slidability and surface abrasion resistance. The Young's modulus of the secondary resin layer is required to be enhanced to suppress the deterioration of the transmission loss due to microbending when an optical fiber is stored in a cable at high density. However, an increase in the Young's modulus of a secondary resin layer results in a decrease in the toughness of the resin layer, and the secondary resin layer easily cracks when external force is applied.

The present disclosure can form a resin layer that has a high Young's modulus, and is excellent in toughness, and an object of the present disclosure is to provide a resin composition for secondary coating of an optical fiber that is excellent in surface slidability and surface abrasion resistance and an optical fiber that is excellent in productivity.

Effects of the Present Disclosure

According to the present disclosure, a resin layer that has a high Young's modulus, and is excellent in toughness can be formed, and a resin composition for secondary coating of an optical fiber that is excellent in surface slidability and surface abrasion resistance and an optical fiber that is excellent in productivity can be provided.

DESCRIPTION OF EMBODIMENTS OF THE PRESENT DISCLOSURE

The contents of the embodiment of the present disclosure will be first enumerated and described. The resin composition for secondary coating of an optical fiber according to one aspect of the present disclosure is a resin composition comprising: a non-reactive urethane compound having a number average molecular weight of 10000 or more and 50000 or less, a photopolymerizable compound, and a photopolymerization initiator, wherein the content of the non-reactive urethane compound is 0.05 parts by mass or more and 5 parts by mass or less based on the total amount of the resin composition, and the non-reactive urethane compound is a reaction product of a polyol having a number average molecular weight of 8000 or more and 20000 or less, a diisocyanate, and a compound having active hydrogen.

Such a resin composition can form a secondary resin layer that maintains high breaking elongation while having a high Young's modulus, and is excellent in surface slidability and surface abrasion resistance when external force is applied to an optical fiber, and can therefore improve the productivity of the optical fiber.

Since the Young's modulus and the breaking elongation of the resin layer are easily adjusted, the polyol may be a polypropylene polyol. Since more moderate toughness is imparted to the secondary resin layer, the compound having active hydrogen may be a monohydric alcohol.

Since moderate toughness is imparted to the secondary resin layer, the photopolymerizable compound may contain 5 parts by mass or more and 40 parts by mass or less of a urethane (meth)acrylate having a number average molecular weight of 500 or more and 6000 or less based on the total amount of the resin composition, and the urethane (meth) acrylate may be a reaction product of a polyol having a number average molecular weight of 300 or more and 2500 or less, a diisocyanate, and a hydroxyl group-containing (meth)acrylate.

Since more moderate toughness is imparted to the secondary resin layer, the photopolymerizable compound may contain 30 parts by mass or more and 70 parts by mass or less of a bisphenol skeleton-containing (meth)acrylate based on the total amount of the resin composition.

The optical fiber according to one aspect of the present disclosure comprises: a glass fiber including a core and a cladding; a primary resin layer coating the glass fiber in contact with the glass fiber; and a secondary resin layer coating the primary resin layer, and the secondary resin layer contains a cured product of the above-mentioned resin composition. Such an optical fiber is excellent in surface slidability and surface abrasion resistance, and can improve the productivity of the optical fiber.

A method for producing the optical fiber according to one aspect of the present disclosure comprises: an application step of applying the above-mentioned resin composition to the periphery of the glass fiber including the core and the cladding, and a curing step of curing the resin composition by irradiation with ultraviolet rays after the application step.

The optical fiber that is excellent in surface slidability and surface abrasion resistance can be produced thereby.

Details of the Embodiments of the Present Disclosure

Specific examples of the resin composition and the optical fiber according to the present embodiment will be described with reference to a drawing if needed. The present disclosure is not limited to this exemplification, is shown by the claims, and is intended to include all modifications in meanings and a scope equivalent to the claims. In the following descriptions, the same components are indicated with the same reference numeral, and the same descriptions are omitted in the description of the drawing.

(Resin Composition)

The resin composition according to the present embodiment contains the non-reactive urethane compound, the photopolymerizable compound, and the photopolymerization initiator. "Non-reactive" herein means not having a photopolymerizable group.

The non-reactive urethane compound according to the present embodiment does not have a photopolymerizable group, and contains a non-reactive urethane compound having a number average molecular weight (Mn) of 10000 or more and 50000 or less (hereinafter referred to as a "non-reactive urethane compound (A)"). It is preferable that the Mn of the non-reactive urethane compound (A) be 12000 or more and 45000 or less, it is more preferable that the Mn be 14000 or more and 44000 or less, and it is further preferable that the Mn be 16000 or more and 40000 or less. When the Mn of the non-reactive urethane compound (A) is less than 10000, the surface slidability and the surface abrasion resistance tend to decrease, and when the Mn exceeds 50000, the resin composition becomes cloudy easily. Since the non-reactive urethane compound is not incorporated into the crosslinking, the non-reactive urethane compound has a plasticizing effect on the coating film, and can improve the breaking elongation. It is considered that the breaking elongation can be improved without reducing the Young's modulus of the resin layer with the hydrogen bonds due to urethane groups.

The non-reactive urethane compound (A) is a reaction product of the polyol having an Mn of 8000 or more and 20000 or less, the diisocyanate, and the compound having active hydrogen. The non-reactive urethane compound (A) has a urethane structure based on the reaction of the polyol having an Mn of 8000 or more and 20000 or less and the diisocyanate and non-reactive groups based on the compound having active hydrogen and bound to terminals of the urethane structure. The non-reactive group may be an alkyl group.

The Mn of the polyol constituting the non-reactive urethane compound (A) is 8000 or more, and may be 9000 or more, or 10000 or more from the viewpoint of improving the toughness, and is 20000 or less, and may be 19000 or less, or 18000 or less from the viewpoint of enhancing the Young's modulus.

Examples of the polyol include polyether polyols, polyester polyols, polycaprolactone polyols, polycarbonate polyols, polybutadiene polyols, and a bisphenol A-ethylene oxide adduct diol. Examples of the polyether polyols include polytetramethylene glycol, polyethylene glycol and polypropylene polyol. Since the Young's modulus and the breaking elongation of the resin layer are easily adjusted, it is preferable to use polypropylene polyol as the polyol. Example of the polypropylene polyol include polypropylene glycol and polypropylene triol.

Examples of commercial items of polyols having an Mn of 8000 or more and 20000 or less include PREMINOL S 4013F, PREMINOL S 4318F, PREMINOL S 3011, and PREMINOL 7012 of AGC Inc.

The compound having active hydrogen according to the present embodiment is a compound to which a group such as a hydroxyl group, an amino group, and a mercapto group having active hydrogen is bound, and is a compound not having a photopolymerizable group such as a (meth)acryloyl group. Examples of the compound having active hydrogen include alcohol compounds, amine compounds, and thiol compounds. Since more moderate toughness is imparted to the secondary resin layer, as the compound having active hydrogen, a monohydric alcohol is preferable, and a monohydric alcohol having 5 or less carbon atoms is more preferable, and a monohydric alcohol having 3 or less carbon atoms is further preferable.

Examples of the monohydric alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, and 3-methyl-2-butanol.

Examples of the diisocyanate include 2,4-tolylene diisocyanate, 2,6-tolylene diisocyanate, isophorone diisocyanate, dicyclohexylmethane diisocyanate, diphenylmethane diisocyanate, hexamethylene diisocyanate, xylylene diisocyanate, hydrogenated xylylene diisocyanate, 1,5-naphthalene diisocyanate, norbornene diisocyanate, 1,5-pentamethylene diisocyanate, tetramethylxylylene diisocyanate, and trimethylhexamethylene diisocyanate.

Examples of the method for synthesizing the non-reactive urethane compound (A) include a method for reacting a polyol and a diisocyanate and then reacting a compound having active hydrogen with the reaction product; a method for reacting a diisocyanate and a compound having active hydrogen and then reacting a polyol with the reaction product; and a method for reacting a polyol, a diisocyanate, and a compound having active hydrogen at the same time. When a difunctional polyol is used, a method for reacting hydroxyl groups (OH) of the polyol and isocyanate groups (NCO) of the diisocyanate and then reacting a compound having active hydrogen with the reaction product is preferable, and when a tri- or more functional polyol is used, a method for reacting the diisocyanate and a compound having active hydrogen and then reacting the polyol with the reaction product is preferable.

The preparation of the non-reactive urethane compound (A) will be described by giving specific examples. As a first embodiment, for example, a difunctional polypropylene polyol (polypropylene glycol) is used as the polyol, 2,4-tolylene diisocyanate is used as the diisocyanate, and methanol is used as the compound having active hydrogen. First, 2,4-tolylene diisocyanate is reacted with polypropylene glycol to synthesize an NCO terminal prepolymer. Then, methanol is reacted with the NCO terminal prepolymer to synthesize the non-reactive urethane compound. The non-reactive urethane compound (A) can be represented by the following formula (1):

M-(U-I-U-P2)m-U-M             (1)

wherein M represents a methanol residue, U represents a urethane bond, I represents a 2,4-tolylene diisocyanate residue, P2 represents a polypropylene glycol residue, and m is an integer of 1 or more. It is preferable that the molar ratio of NCO to OH (NCO/OH) when polypropylene glycol and 2,4-tolylene diisocyanate are reacted be 1.5 or more and 2.5 or less, and it is more preferable that the molar ratio be 1.8 or more and 2.2 or less. It is preferable that the molar ratio of methanol to NCO of the NCO-terminated prepolymer be 1.00 or more and 1.15 or less, and it is more preferable that the molar ratio be 1.03 or more and 1.10 or less.

As a second embodiment, for example, a trifunctional polypropylene polyol (polypropylene triol) is used as the polyol, 2,4-tolylene diisocyanate is used as the diisocyanate, and methanol is used as the compound having active hydrogen. First, 2,4-tolylene diisocyanate and methanol are reacted to obtain an isocyanate in which NCO is partially blocked. Then, the isocyanate in which NCO is partially blocked and polypropylene triol are reacted to synthesize a non-reactive urethane compound. The non-reactive urethane compound (A) can be represented by the following formula (2).

(HO)t-P3-(U-I-U)s-M             (2)

wherein M represents a methanol residue, U represents a urethane bond, I represents a 2,4-tolylene diisocyanate residue, P3 represents a polypropylene triol residue, t is 0, 1, or 2, s is an integer of 1 or more and 3 or less, and t+s is 3. It is preferable that the molar ratio of NCO of the 2,4-tolylene diisocyanate to methanol (NCO/OH) be 1.95 or more and 2.05 or less. It is preferable that the molar ratio of OH of polypropylene triol to NCO of the partially blocked isocyanate (OH/NCO) be 1.0 or more and 1.5 or less, and it is more preferable that the molar ratio be 1.03 or more and 1.3 or less.

The content of the non-reactive urethane compound (A) is 0.05 parts by mass or more, it is preferable that the content be 0.1 parts by mass or more, it is more preferable that the content be 0.2 parts by mass or more, and it is further preferable that the content be 0.3 parts by mass or more based on the total amount of the resin composition (100 parts by mass) from the viewpoint of improving the surface slidability and the surface abrasion resistance. The content of the non-reactive urethane compound (A) is 5 parts by mass or less, it is preferable that the content be 4 parts by mass or less, it is more preferable that the content be 3 parts by mass or less, and it is further preferable that the content be 2 parts by mass or less based on the total amount of the resin composition from the viewpoint of suppressing a decrease in the Young's modulus of the secondary resin layer.

The photopolymerizable compound according to the present embodiment may contain a urethane (meth)acrylate having an Mn of 500 or more and 6000 or less (hereinafter referred to as a "urethane (meth)acrylate (B)") from the viewpoint of forming a tough secondary resin layer. It is preferable that the Mn of the urethane (meth)acrylate (B) be 600 or more and 5500 or less, it is more preferable that the Mn be 700 or more and 5000 or less, and it is further preferable that the Mn be 1000 or more and 4000 or less. When the Mn of the urethane (meth)acrylate (B) is 500 or more, the formation of the tough secondary resin layer is facilitated, and when the Mn is 6000 or less, the enhancement of the Young's modulus of the secondary resin layer is facilitated.

Here, a (meth)acrylate means an acrylate or a methacrylate corresponding thereto. Other similar expressions such as (meth)acryloyl are in the same way.

It is preferable that the content of the urethane (meth)acrylate (B) be 5 parts by mass or more and 40 parts by mass or less, and it is more preferable that the content be 10 parts by mass or more and 35 parts by mass or less based on the total amount of the resin composition. When the content is 5 parts by mass or more, a tough secondary resin layer is easily formed, and when the content is 40 parts by mass or less, the Young's modulus of the secondary resin layer is easily enhanced.

The urethane (meth)acrylate (B) may be a reaction product of a polyol having an Mn of 300 or more and 2500 or less, a diisocyanate, and a hydroxyl group-containing (meth)acrylate. It is preferable that the urethane (meth)acrylate (B) have urethane structure based on the reaction of the polyol having an Mn of 300 or more and 2500 or less and the diisocyanate and (meth)acryloyl groups bound to terminals of the urethane structure.

Examples of the hydroxyl group-containing (meth)acrylate include 2-hydroxyethyl (meth)acrylate, 2-hydroxypropyl (meth)acrylate, 2-hydroxybutyl (meth)acrylate, caprolactone (meth)acrylate, 2-hydroxy-3-phenoxypropyl (meth)acrylate, 2-(meth)acryloyloxyethyl-2-hydroxyethyl phthalic acid, 2-hydroxy-O-phenylphenolpropyl (meth)acrylate, 2-hydroxy-3-methacrylpropyl acrylate, trimethylolpropane di(meth)acrylate, and pentaerythritol tri(meth)acrylate.

The polyol having an Mn of 300 or more and 2500 or less and the diisocyanate can be reacted at an NCO/OH of 1.5 or more and 6 or less, and the reaction product can be then reacted with the hydroxyl group-containing (meth)acrylate to obtain the urethane (meth)acrylate (B). When the NCO/OH is in the above-mentioned range, the formation of the tough secondary resin layer is facilitated.

The preparation of the urethane (meth)acrylate (B) will be described by giving a specific example. For example, polypropylene glycol is used as the polyol, 2,4-tolylene diisocyanate is used as the diisocyanate, and 2-hydroxyethyl acrylate is used as the hydroxyl group-containing (meth) acrylate. First, 2,4-tolylene diisocyanate is reacted with polypropylene glycol to synthesize an NCO terminal prepolymer. Then, 2-hydroxyethyl acrylate is reacted with the NCO terminal prepolymer to synthesize the urethane acrylate. The urethane acrylate (B) can be represented by the following formula (3):

A-(U-I-U-P)n-U-A        (3)

wherein A represents a 2-hydroxyethyl acrylate residue, U represents a urethane bond, I represents a 2,4-tolylene diisocyanate residue, P represents a polypropylene glycol residue, and n is an integer of 1 or more. With respect to n, the proportion of urethane bonds which the urethane acrylate has can be varied by changing the NCO/OH. As the NCO/OH becomes lower, n becomes larger, and as the NCO/OH becomes higher, n becomes smaller.

It is more preferable that the Mn of the polyol constituting the urethane (meth)acrylate (B) be 350 or more and 2200 or less, it is further preferable that the Mn be 400 or more and 2000 or less, and it is still preferable that the Mn be 500 or more and 1500 or less from the viewpoint of improving the toughness of the secondary resin layer.

An organotin compound or an amine compound is used as a catalyst when the non-reactive urethane compound (A) and the urethane (meth)acrylate (B) are synthesized. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. It is preferable to use dibutyltin dilaurate or dibutyltin diacetate from the viewpoints of availability or catalyst performance as the catalyst.

Since moderate toughness is imparted to the secondary resin layer, the photopolymerizable compound according to the present embodiment may contain a bisphenol skeleton-containing (meth)acrylate. Examples of the (meth)acrylate compound having bisphenol skeletons include bisphenol A epoxy di(meth)acrylate, bisphenol F epoxy di(meth)acrylate, an EO adduct of bisphenol A di(meth)acrylate, an EO adduct of bisphenol F di(meth)acrylate, a PO adduct of bisphenol A di(meth)acrylate, and a PO adduct of bisphenol F di(meth)acrylate. The epoxy di(meth)acrylate is a compound obtained by reacting a compound such as (meth)acrylic acid having (meth)acryloyl groups with an epoxy compound having two or more glycidyl groups. Since tough physical properties in good balance between a high Young modulus and the breaking elongation are easily obtained, it is preferable that the bisphenol skeleton-containing (meth)acrylate contain bisphenol A epoxy di(meth)acrylate or an EO adduct of bisphenol A di(meth)acrylate.

The content of the bisphenol skeleton-containing (meth)acrylate may be 30 parts by mass or more, 35 parts by mass or more, or 40 parts by mass or more, and may be 70 parts by mass or less, 65 parts by mass or less, or 60 parts by mass or less based on the total amount of the resin composition.

The photopolymerizable compound according to the present embodiment may further contain a photopolymerizable compound other than the urethane (meth)acrylate and the bisphenol skeleton-containing (meth)acrylate (hereinafter referred to as a "monomer"). As the monomer, a monofunctional monomer having one photopolymerizable ethylenic unsaturated group or a polyfunctional monomer having two or more ethylenic unsaturated groups can be used. The monomers may be used as a mixture of two or more.

Examples of the monofunctional monomer include (meth)acrylate-based monomers such as methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate (for example, the trade name "SR504" produced by Sartomer), nonylphenoxypolyethylene glycol (meth)acrylate, isobornyl (meth)acrylate, 3-phenoxybenzyl (meth)acrylate, methylphenoxy ethyl (meth)acrylate, phenoxydiethylene glycol (meth)acrylate, phenoxypolyethylene glycol (meth)acrylate, m-phenoxybenzyl (meth)acrylate, 2-(2-ethoxyethoxy)ethyl (meth)acrylate, and 2-hydroxy-3-phenoxypropyl acrylate; carboxy group-containing monomers such as (meth)acrylic acid, (meth)acrylic acid dimers, carboxyethyl (meth)acrylate, carboxypentyl (meth)acrylate, and ω-carboxypolycaprolactone (meth)acrylate; and nitrogen-containing monomers such as N-acryloyl morpholine, N-vinyl pyrrolidone, N-vinylcaprolactam, 3-(3-pyridinyl) propyl (meth)acrylate, N,N-dimethylacrylamide, N-hydroxyethylacrylamide, N,N-diethylacrylamide, N-isopropylacrylamide, N,N-dimethylaminopropyl acryl amide, N,N-dimethylaminopropylacrylamide-methyl chloride salt, diacetone acrylamide, N-acryloylpiperidine, N-methacryloylpiperidine, N-acryloylpyrrolidine, maleimide, N-cyclohexylmaleimide, N-phenylmaleimide, (meth)acrylamide, N,N-dimethyl (meth)acrylamide, N-hexyl (meth)acrylamide, N-methyl (meth)acrylamide, N-butyl (meth)acrylamide, N-methylol (meth)acrylamide, N-methylolpropane (meth)acrylamide, aminoethyl (meth)acrylate, aminopropyl (meth)acrylate, N,N-dimethylaminoethyl (meth)acrylate, and t-butylaminoethyl (meth)acrylate.

Examples of the polyfunctional monomer include difunctional monomers such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, triethylene glycol di(meth)acrylate, cyclohexanedimethanol di(meth)acrylate, dipropylene glycol di(meth)acrylate, tetraethylene glycol di(meth)acrylate, hydroxypivalate neopentyl glycol di(meth)acrylate, 1,3-butylene glycol di(meth)acrylate, 1,4-butanediol di(meth)acrylate, diethylene glycol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-haxadecanediol di(meth)acrylate, 1,20-eicosanediol di(meth)acrylate, isopentyldiol di(meth)acrylate, 3-ethyl-1,8-octanediol di(meth)acrylate, tricyclodecanol di(meth)acrylate, and 9,9-bis [4-(2-hydroxyethoxy)phenyl]fluorene di(meth)acrylate; and tri- or more functional monomers such as trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris [(meth)acryloyloxyethyl]isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra (meth)acrylate, dipentaerythritol tetra(meth)acrylate, dipentaerythritol penta (meth)acrylate, dipentaerythritol hexa (meth)acrylate, and caprolactone-modified tris [(meth)acryloyloxyethyl] isocyanurate.

The photopolymerization initiator can be suitably selected from well-known radical photopolymerization initiators and used. Examples of the photopolymerization initiator include 1-hydroxycyclohexyl phenyl ketone (Omnirad 184, produced by IGM Resins B.V.), 2,2-dimethoxy-2-phenyl acetophenone (Omnirad 651, produced by IGM Resins B.V.), 2,4,6-trimethylbenzoyl diphenylphosphine oxide (Omnirad TPO, produced by IGM Resins B.V.), ethyl (2,4,6-trimethylbenzoyl)-phenyl phosphinate (Omnirad TPO-L, produced by IGM Resins B.V.), 2-benzoyl-2-dimethylamino-4'-morpholinobutyrophenone (Omnirad TPO369, produced by IGM Resins B.V.), 2-dimethylamino-2-(4-methylbenzyl)-1-(4-morpholin-4-yl-phenyl)-butan-1-one (Omnirad TPO 379, produced by IGM Resins B.V.), bis(2,4,6-trimethylbenzoyl) phenylphosphine oxide (Omnirad 819, produced by IGM Resins B.V.), and 2-methyl-1-[4-(methylthio)phenyl]-2-morpholinopropan-1-one (Omnirad 907, produced by IGM Resins B.V.).

The photopolymerization initiator may be used as a mixture of two or more. It is preferable due to excellent rapid curability of the resin composition that the photopolymerization initiator contain 2,4,6-trimethylbenzoyldiphenylphosphine oxide.

It is preferable that the content of the photopolymerization initiator be 0.2 parts by mass or more and 5 parts by mass or less, it is more preferable that the content be 0.3 parts by mass or more and 4 parts by mass or less, and it is further preferable that the content be 0.4 parts by mass or more and 3 parts by mass or less based on the total amount of the resin composition.

The resin composition according to the present embodiment may further contain a photoacid generator, a leveling agent, an antifoaming agent, an antioxidant, and the like.

An onium salt having a structure of A'B may be used as the photoacid generator. Examples of the photoacid generator include sulfonium salts such as CPI-100P and 110P (produced by San-Apro Ltd.) and Omnicat 270 and 290 (produced by IGM Resins B.V.); and iodonium salts such as Omnicat 250 (produced by IGM Resins B.V.), WPI-113, 116, 124, 169, and 170 (produced by FUJIFILM Wako Pure Chemical Corporation).

It is preferable that the viscosity at 25° C. of the resin composition according to the present embodiment be 0.5 Pads or more and 10 Pads or less, and it is more preferable that the viscosity be 1 Pa's or more and 9 Pa's or less from the viewpoint of coatability.

(Optical Fiber)

FIG. 1 is a schematic sectional view showing one example of the optical fiber according to the present embodiment. An optical fiber 10 comprises a glass fiber 13 including a core 11 and a cladding 12 and a coating resin layer 16 including a primary resin layer 14 and a secondary resin layer 15 provided on the periphery of the glass fiber 13.

The cladding 12 surrounds the core 11. The core 11 and the cladding 12 mainly contain glass such as silica glass, and for example, germanium-added silica glass or pure silica glass can be used for the core 11, and pure silica glass or fluorine-added silica glass can be used for the cladding 12.

In FIG. 1, for example, the outer diameter of the glass fiber 13 (D2) is around 100 μm to 125 μm, and the diameter of the core 11 (D1), constituting the glass fiber 13, is around 7 μm to 15 μm. The thickness of the coating resin layer 16 is usually around 22 μm to 70 μm. The thickness of each layer of the primary resin layer 14 and the secondary resin layer 15 may be around 5 μm to 50 μm.

When the outer diameter of the glass fiber 13 is around 125 μm, and the thickness of the coating resin layer 16 is 60 μm or more and 70 μm or less, the thickness of each layer of the primary resin layer 14 and the secondary resin layer 15 may be around 10 μm to 50 μm, and, for example, the thickness of the primary resin layer 14 may be 35 μm, and the thickness of secondary resin layer 15 may be 25 μm. The outer diameter of the optical fiber 10 may be around 245 μm to 265 μm.

When the outer diameter of the glass fiber 13 is around 125 μm, and the thickness of the coating resin layer 16 is 24 μm or more and 48 μm or less, the thickness of each layer of the primary resin layer 14 and the secondary resin layer 15 may be around 8 μm to 38 μm, and, for example, the thickness of the primary resin layer 14 may be 25 μm, and the thickness of the secondary resin layer 15 may be 10 μm. The outer diameter of the optical fiber 10 may be around 173 μm to 221 μm.

When the outer diameter of the glass fiber 13 is around 100 μm, and the thickness of the coating resin layer 16 is 22 μm or more and 37 μm or less, the thickness of each layer of the primary resin layer 14 and the secondary resin layer 15 may be around 5 μm to 32 μm, and, for example, the thickness of the primary resin layer 14 may be 25 μm, and the thickness of the secondary resin layer 15 may be 10 μm. The outer diameter of the optical fiber 10 may be around 144 μm to 174 μm.

The resin composition according to the present embodiment can be applied to the secondary resin layer to produce an optical fiber that is excellent in productivity.

The method for producing the optical fiber according to the present embodiment comprises: an application step of applying the above-mentioned resin composition to the periphery of the glass fiber including the core and the cladding; and a curing step of curing the resin composition by irradiation with ultraviolet rays after the application step.

It is preferable that the Young's modulus of the secondary resin layer at 23° C.±2° C. be 800 MPa or more, it is more preferable that the Young's modulus be 1000 MPa or more, and it is further preferable that the Young's modulus be 1200 MPa or more from the viewpoint of improving the microbending resistance of the optical fiber. Although the Young's modulus of the secondary resin layer is not particularly limited, the upper limit may be 3000 MPa or less, 2500 MPa or less, or 2000 MPa or less at 23° C.±2° C. from the viewpoint of imparting moderate toughness to the secondary resin layer.

The Young's modulus of the secondary resin layer can be measured by the following method. First, the optical fiber is immersed in a mixed solvent of acetone and ethanol, and only the coating resin layer is extracted in a cylindrical shape. Although the primary resin layer and the secondary resin layer are united at this time, the Young's modulus of the primary resin layer is 1/1000 or more and 1/10000 or less of the Young's modulus of the secondary resin layer, the Young's modulus of the primary resin layer is therefore negligible. Next, the solvent is removed from the coating resin layer by vacuum drying, a tensile test (the tensile speed is 1 mm/minute) can be performed at 23° C., and the Young's modulus can be calculated by a secant expression at 2.5% strain.

It is preferable that the glass transition temperature (Tg) of the secondary resin layer be 70° C. or more, and it is more preferable that the glass transition temperature be 75° C. or more from the viewpoint of improving the heat resistance of the secondary resin layer. It is preferable that the Tg of the secondary resin layer be 105° C. or less, and it is more preferable that the Tg be 95° C. or less from the viewpoint of suppressing an increase in the transmission loss at low temperature of the optical fiber.

The Tg of the secondary resin layer can be measured by the following method. First, an optical fiber is immersed in a mixed solvent of acetone and ethanol, and only the coating resin layer is extracted in a cylindrical shape. Next, the solvent is removed from the coating resin layer by vacuum drying, the dynamic viscoelasticity is then measured under the conditions of a tensile mode (gauge length: 25 mm), a frequency of 11 Hz, a rate of temperature increase of 5° C./minute, and the temperature range of 25° C. to 150° C. using an "RSA-G2" manufactured by TA instruments, and the peak top temperature of tan δ can be found as Tg. Since the Tg of the primary resin layer is usually 0° C. or less, the Tg of the primary resin layer can be negligible.

The resin composition containing, for example, the urethane (meth)acrylate, the monomer, the photopolymerization initiator, and the like can be cured to form the primary resin layer 14. The resin composition that forms the primary resin layer has a constitution different from the resin composition for secondary coating. The resin composition for the primary coating can be prepared using a conventionally well-known technique.

It is preferable that the Young's modulus of the primary resin layer be 0.5 MPa or less. When the Young's modulus of the primary resin layer exceeds 0.5 MPa, external force is easily transmitted to the glass fiber, and the transmission loss increase due to microbending may rise.

A plurality of optical fibers may be paralleled and integrated with a resin for a ribbon to form an optical fiber ribbon. The resin composition according to the present disclosure can also be used as the resin for a ribbon. The surface slidability and the surface abrasion resistance when external force is applied to the optical fiber ribbon can be improved thereby in the same way as the optical fiber.

EXAMPLES

Hereinafter, the results of evaluation tests using Examples and Comparative Examples according to the present disclosure will be shown, and the present disclosure will be described in further detail. The present invention is not limited to these Examples.

[Synthesis of Non-Reactive Urethane Compound]

(A-1)

Polypropylene glycol having an Mn of 12000 (produced by AGC Inc., PREMINOL S 4013F) and 2,4-tolylene diisocyanate (TDI) were reacted at 60° C. for 1 hour so that the molar ratio of NCO to OH (NCO/OH)=2.0 to prepare an NCO terminal prepolymer. As a catalyst, 200 ppm dibutyltin dilaurate was added with respect to the final total fed amount. Next, methanol was added so that the molar ratio of the OH of methanol to the NCO of the NCO terminal prepolymer was 1.05, and the mixture was reacted at 60° C. for 1 hour to obtain a non-reactive urethane compound having an Mn of 25600 (A-1).

(A-2)

A non-reactive urethane compound having an Mn of 43300 (A-2) was obtained in the same way as in the synthesis of (A-1) except that polypropylene glycol having an Mn of 18000 (produced by AGC Inc., PREMINOL S 4318F) and TDI were reacted so that NCO/OH=2.0 to prepare an NCO terminal prepolymer.

(A-3)

Isophorone diisocyanate (IPDI) and methanol were reacted at 60° C. for 1 hour so that NCO/OH=2.0 to prepare a partial blocked isocyanate. As a catalyst, 200 ppm dibutyl tin dilaurate was added with respect to the final total fed amount. Then, polypropylene triol having an Mn of 10000 (produced by AGC Inc., PREMINOL S 3011) was added to the partial blocked isocyanate so that OH/NCO=1.05, and the mixture was reacted at 60° C. for 1 hour to obtain a non-reactive urethane compound having an Mn of 16600 (A-3).

(Y-1)

A non-reactive urethane compound having an Mn of 7300 (Y-1) was obtained in the same way as in the synthesis of (A-1) except that polypropylene glycol having an Mn of 3000 and TDI were reacted so that NCO/OH=2.0 to prepare an NCO-terminated prepolymer.

(Y-2)

A non-reactive urethane compound having an Mn of 9700 (Y-2) was obtained in the same way as in the synthesis of (A-1) except that polypropylene glycol having an Mn of 4000 and TDI were reacted so that NCO/OH=2.0 to prepare an NCO terminal prepolymer.

(Y-3)

A non-reactive urethane compound having an Mn of 63200 (Y-3) was obtained in the same way as in the synthesis of (A-1) except that polypropylene glycol having an Mn of 18000 and TDI were reacted so that NCO/OH=1.5 to prepare an NCO-terminated prepolymer.

[Synthesis of Urethane Acrylate]

(B-1)

Polypropylene glycol having an Mn of 400 and IPDI were reacted at 60° C. for 1 hour so that NCO/OH=1.5 to prepare an NCO-terminated prepolymer. As a catalyst, 200 ppm dibutyltin dilaurate was added with respect to the final total fed amount. Next, 2-hydroxyethyl acrylate (HEA) was added so that the molar ratio of the OH of HEA to the NCO of the NCO terminal prepolymer was 1.05, and the mixture was reacted at 60° C. for 1 hour to obtain a urethane acrylate having an Mn of 1900 (B-1).

(B-2)

A urethane acrylate having an Mn of 2200 (B-2) was obtained in the same way as in the synthesis of (B-1) except that polypropylene glycol having an Mn of 600 and TDI were reacted so that NCO/OH=2.0 to prepare an NCO terminal prepolymer.

(B-3)

A urethane acrylate having an Mn of 760 (B-3) was obtained in the same way as in the synthesis of (B-1) except that polypropylene glycol having an Mn of 600 and TDI were reacted so that NCO/OH=6.0 to prepare an NCO terminal prepolymer.

(B-4)

A urethane acrylate having an Mn of 2900 (B-4) was obtained in the same way as in the synthesis of (B-1) except that polypropylene glycol having an Mn of 1000 and TDI were reacted so that NCO/OH=2.0 to prepare an NCO terminal prepolymer.

(B-5)

A urethane acrylate having an Mn of 5400 (B-5) was obtained in the same way as in the synthesis of (B-1) except that polypropylene glycol having an Mn of 2000 and TDI were reacted so that NCO/OH=2.0 to prepare an NCO terminal prepolymer.

(Z-1)

A urethane acrylate having an Mn of 11400 (Z-1) was obtained in the same way as in the synthesis of (B-1) except that polypropylene glycol having an Mn of 3000 and IPDI were reacted at 60° C. for 1 hour so that NCO/OH=1.5 to prepare an NCO-terminated prepolymer.

The Mn of the polyols are values described in the catalogues of the products. The Mn of the non-reactive urethane compound and the urethane acrylate was measured using an ACQUITY APC RI system manufactured by Nihon Waters K.K. under the conditions of sample concentration: 0.2% by mass THF solution, injection rate: 20 μL, sample temperature: 15° C., mobile phase: THF, XT columns for organic solvent: particle size 2.5 μm, pore size 450 Å, column inner diameter 4.6×column length 150 mm+particle size 2.5 μm, pore size 125 Å, column inner diameter 4.6×column length 150 mm+particle size 1.7 μm, pore size 45 Å, column inner diameter 4.6×column length 150 mm, column temperature: 40° C., and flow velocity: 0.8 mL/minute.

[Resin Composition for Secondary Coating]

As the bisphenol skeleton-containing diacrylates, bisphenol A epoxy di(meth)acrylate (Viscoat #540) and an EO adduct of bisphenol A diacrylate (Viscoat #700) were provided. As the monomers, tripropylene glycol diacrylate (TPGDA) and 2-phenoxyethyl acrylate (POA) were provided. As the photopolymerization initiators, 2,4,6-trimethylbenzoyl diphenylphosphine oxide (Omnirad TPO) and 1-hydroxycyclohexyl phenyl ketone (Omnirad 184) were provided.

Non-reactive urethane compounds, urethane acrylates, bisphenol skeleton-containing diacrylates, monomers, and photopolymerization initiators were mixed in blended amounts (part by mass) shown in Table 1 or Table 2 to produce resin compositions for secondary coating of the Examples and the Comparative Examples.

(Appearance of Resin Compositions for Secondary Coating)

Each of the resin compositions was visually observed; if the resin composition was transparent, the resin composition was evaluated as "OK"; and if the resin composition was cloudy, the resin composition was evaluated as "NG". Since the resin composition of Comparative Example 4 was cloudy, the resin composition was not used for producing an optical fiber.

(Resin Composition for Primary Coating)

First, 70 parts by mass of urethane acrylate (Z-1), 19 parts by mass of nonylphenol polyethylene glycol acrylate (produced by Sartomer, trade name "SR504"), 5 parts by mass of N-vinyl caprolactam, 5 parts by mass of isobornyl acrylate, and 1 part by mass of Omnirad TPO were mixed to obtain a resin composition for primary coating.

[Production of Optical Fibers]

The resin composition for primary coating and each resin composition for secondary coating were applied to the peripheral surface of the glass fiber 13 having a diameter of 125 μm. Subsequently, the resin compositions were cured by irradiation with ultraviolet rays, the coating resin layer 16 comprising the primary resin layer 14 and the secondary resin layer 15 was formed to produce the optical fiber 10. The thickness of the primary resin layer 14 was adjusted to 35 μm, and the thickness of the secondary resin layer 15 was adjusted to 25 μm.

(Young's Moduli of Secondary Resin Layers)

Each optical fiber was immersed in a mixed solvent of acetone and ethanol, and only the coating resin layer was extracted in a cylindrical shape. Next, the solvent was removed from the coating resin layer by vacuum drying, a tensile test (the tensile speed was 1 mm/minute) was then performed at 23° C., and the Young's modulus was calculated by a secant expression at 2.5% strain. If the Young's modulus was 1200 MPa or more, the secondary resin layer was evaluated as "A"; if the Young's modulus was 800 MPa or more and less than 1200 MPa, the secondary resin layer was evaluated as "B"; and if the Young's modulus was less than 800 MPa, the secondary resin layer was evaluated as "C".

(Breaking Elongation of Secondary Resin Layers)

Each optical fiber was immersed in a mixed solvent of acetone and ethanol, and only the coating resin layer was extracted in a cylindrical shape. Next, the solvent was removed from the coating resin layer by vacuum drying, a tensile test (the tensile speed was 50 mm/minute) was then performed at 23° C., and the breaking elongation was determined. If the breaking elongation was 10% or more, the secondary resin layer was evaluated as "A"; if the breaking elongation was 5% or more and less than 10%, the secondary resin layer was evaluated as "B"; and if the breaking elongation was less than 5%, the secondary resin layer was evaluated as "C".

(Winding Abnormality Frequency of Optical Fiber)

To evaluate the productivity of the optical fiber, the winding abnormality frequency was measured. First, 500 km of the optical fiber was wound at a linear velocity of 1000 m/minute (50 km×10 bobbins), and the transmission loss of the optical fiber of each bobbin in the longitudinal direction was evaluated using an OTDR (optical time domain reflectometer). The measurement wavelength was 1550 nm. An optical fiber in which points at which the Point Discontinuities exceed 0.05 dB (winding abnormality frequency) were two or less points/500 km was evaluated as "A", an optical fiber in which points at which the Point Discontinuities exceed 0.05 dB (winding abnormality frequency) were three to five points/500 km was evaluated as "B", and an optical fiber in which points at which the Point Discontinuities exceed 0.05 dB (winding abnormality frequency) were six or more points/500 km was evaluated as "C".

TABLE 1

|  | Example | | | | | | | | |
| --- | --- | --- | --- | --- | --- | --- | --- | --- | --- |
|  | 1 | 2 | 3 | 4 | 5 | 6 | 7 | 8 | 9 |
| A-1 | 2 | — | — | 1 | — | 0.5 | 0.3 | 0.1 | 2 |
| A-2 | — | 2 | — | — | 4 | — | — | — | — |
| A-3 | — | — | 2 | — | — | — | — | — | — |
| B-1 | — | — | — | 15 | — | — | — | — | — |
| B-2 | 25 | 25 | 25 | — | 8 | — | — | — | 37 |
| B-3 | — | — | — | — | — | 30 | — | — | — |
| B-4 | — | — | — | — | — | — | 20 | — | — |
| B-5 | — | — | — | — | — | — | — | 20 | — |
| Viscoat #540 | 40 | 40 | 30 | 50 | 55 | 30 | 40 | 50 | 30 |
| Viscoat #700 | — | — | 10 | — | 10 | 10 | — | — | 10 |
| TPGDA | 31 | 21 | 21 | 12 | 21 | 27.5 | 27.7 | 27.9 | 3 |
| POA | — | 10 | 10 | 20 | — | — | 10 | — | 16 |
| Omnirad TPO | 1 | 1 | 1 | 1 | 1 | 1 | 1 | 1 | 1 |
| Omnirad 184 | 1 | 1 | 1 | 1 | 1 | 1 | 1 | 1 | 1 |
| Appearance | OK | OK | OK | OK | OK | OK | OK | OK | OK |
| Young's modulus (MPa) | A 1550 | A 1720 | A 1540 | A 2020 | A 2060 | A 1680 | B 1130 | B 1100 | A 1400 |

TABLE 1-continued

|  | Example | | | | | | | | |
|---|---|---|---|---|---|---|---|---|---|
|  | 1 | 2 | 3 | 4 | 5 | 6 | 7 | 8 | 9 |
| Breaking elongation (%) | A 12 | A 13 | A 11 | A 10 | A 11 | A 13 | A 21 | B 8 | A 19 |
| Winding abnormality frequency | A 0 | A 0 | A 0 | A 0 | A 0 | A 1 | B 3 | B 4 | A 0 |

TABLE 2

|  | Comparative Example | | | | | |
|---|---|---|---|---|---|---|
|  | 1 | 2 | 3 | 4 | 5 | 6 |
| Y-1 | — | 2 | — | 1 | — | — |
| Y-2 | — | — | 2 | — | — | — |
| Y-3 | — | — | — | 2 | — | — |
| B-2 | 25 | 25 | 25 | 25 | 8 | — |
| B-4 | — | — | — | — | — | 30 |
| Viscoat #540 | 40 | 40 | 40 | 40 | 55 | 20 |
| Viscoat #700 | — | — | — | — | 10 | — |
| TPGDA | 33 | 31 | 31 | 31 | 25 | 27 |
| Omnirad TPO | 1 | 1 | 1 | 1 | 1 | 1 |
| Omnirad 184 | 1 | 1 | 1 | 1 | 1 | 1 |
| Appearance | OK | OK | OK | NG | OK | OK |
| Young's modulus (MPa) | A 1570 | A 1570 | A 1560 | — | A 2110 | C 660 |
| Breaking elongation (%) | B 8 | B 8 | B 9 | — | C 4 | A 38 |
| Winding abnormality frequency | C 18 | C 17 | C 16 | — | C 16 | C 29 |

REFERENCE SIGNS LIST

10: Optical Fiber
11: Core
12: Cladding
13: Glass Fiber
14: Primary Resin Layer
15: Secondary Resin Layer
16: Coating Resin Layer

The invention claimed is:

1. A resin composition for secondary coating of an optical fiber, the resin composition comprising:
   a non-reactive urethane compound having a number average molecular weight of 10000 or more and 50000 or less;
   a photopolymerizable compound; and
   a photopolymerization initiator,
   wherein a content of the non-reactive urethane compound is 0.05 parts by mass or more and 5 parts by mass or less based on a total amount of the resin composition, and
   the non-reactive urethane compound is a reaction product of a polyol having a number average molecular weight of 8000 or more and 20000 or less, a diisocyanate, and a compound having active hydrogen.

2. The resin composition according to claim 1, wherein the polyol is a polypropylene polyol.

3. The resin composition according to claim 1, wherein the compound having active hydrogen is a monohydric alcohol.

4. The resin composition according to claim 1, wherein the photopolymerizable compound contains 5 parts by mass or more and 40 parts by mass or less of a urethane (meth)acrylate having a number average molecular weight of 500 or more and 6000 or less based on a total amount of the resin composition, and
   the urethane (meth)acrylate is a reaction product of a polyol having a number average molecular weight of 300 or more and 2500 or less, a diisocyanate, and a hydroxyl group-containing (meth)acrylate.

5. The resin composition according to claim 1, wherein the photopolymerizable compound contains 30 parts by mass or more and 70 parts by mass or less of a bisphenol skeleton-containing (meth)acrylate based on a total amount of the resin composition.

6. An optical fiber comprising:
   a glass fiber comprising a core and a cladding;
   a primary resin layer coating the glass fiber in contact with the glass fiber; and
   a secondary resin layer coating the primary resin layer,
   wherein the secondary resin layer comprises a cured product of the resin composition according to claim 1.

7. A method for producing an optical fiber, the method comprising:
   an application step of applying the resin composition according to claim 1 to a periphery of a glass fiber comprising a core and a cladding; and
   a curing step of curing the resin composition by irradiation with ultraviolet rays after the application step.

* * * * *